(12) United States Patent  (10) Patent No.: US 9,377,371 B2
Nguyen et al.  (45) Date of Patent: Jun. 28, 2016

(54) FLEXIBLE DISPLAY DEVICE AND CONTROL METHOD THEREOF

(71) Applicant: SAMSUNG DISPLAY CO., LTD., Yongin, Gyeonggi-Do (KR)

(72) Inventors: Thanh Tien Nguyen, Seoul (KR); Min-Sung Kim, Hwaseong-si (KR); Tae Woong Kim, Yongin-si (KR); Ki Hyun Kim, Daegu (KR); Jin Hwan Choi, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 132 days.

(21) Appl. No.: 14/465,537

(22) Filed: Aug. 21, 2014

(65) Prior Publication Data

US 2015/0192481 A1  Jul. 9, 2015

(30) Foreign Application Priority Data

Jan. 7, 2014  (KR) .......................... 10-2014-0001958

(51) Int. Cl.
*G09G 5/00*  (2006.01)
*G01L 1/22*  (2006.01)
*G09G 3/20*  (2006.01)
*G02F 1/133*  (2006.01)
*G02F 1/1333*  (2006.01)

(52) U.S. Cl.
CPC .............. *G01L 1/22* (2013.01); *G02F 1/13306* (2013.01); *G02F 1/133305* (2013.01); *G09G 3/20* (2013.01); *G02F 2001/133394* (2013.01); *G09G 2300/043* (2013.01); *G09G 2330/04* (2013.01); *G09G 2380/02* (2013.01)

(58) Field of Classification Search
CPC . G01L 1/22; G02F 1/133305; G02F 1/13306; G02F 2001/133394; G09G 3/20; G09G 2300/043; G09G 2330/04; G09G 2380/02
See application file for complete search history.

(56) References Cited

U.S. PATENT DOCUMENTS

| 2003/0227441 | A1* | 12/2003 | Hioki ..................... G06F 3/0412 345/156 |
| 2007/0058118 | A1* | 3/2007 | Cirkel ............... G02F 1/133305 349/117 |
| 2010/0308335 | A1 | 12/2010 | Kim et al. |

FOREIGN PATENT DOCUMENTS

| KR | 100956238 B1 | 6/2009 |
| KR | 1020110106539 A | 9/2011 |

* cited by examiner

*Primary Examiner* — Matthew Sim
(74) *Attorney, Agent, or Firm* — Cantor Colburn LLP

(57) ABSTRACT

A flexible display device including a flexible display panel which displays an image, a strain gauge disposed in the flexible display panel, where the strain gauge senses a strain in the flexible display panel and generates a detection signal based on the sensed strain, a strain controller which receives the detection signal and outputs a strain compensation voltage based on the detection signal, and a strain compensation layer disposed on a surface of the flexible display panel and which receives the strain compensation voltage, where a thickness of the strain compensation layer may be controlled based on the strain compensation voltage such that a neutral plane of the flexible display device is maintained in a predetermined reference area in the flexible display panel.

16 Claims, 8 Drawing Sheets

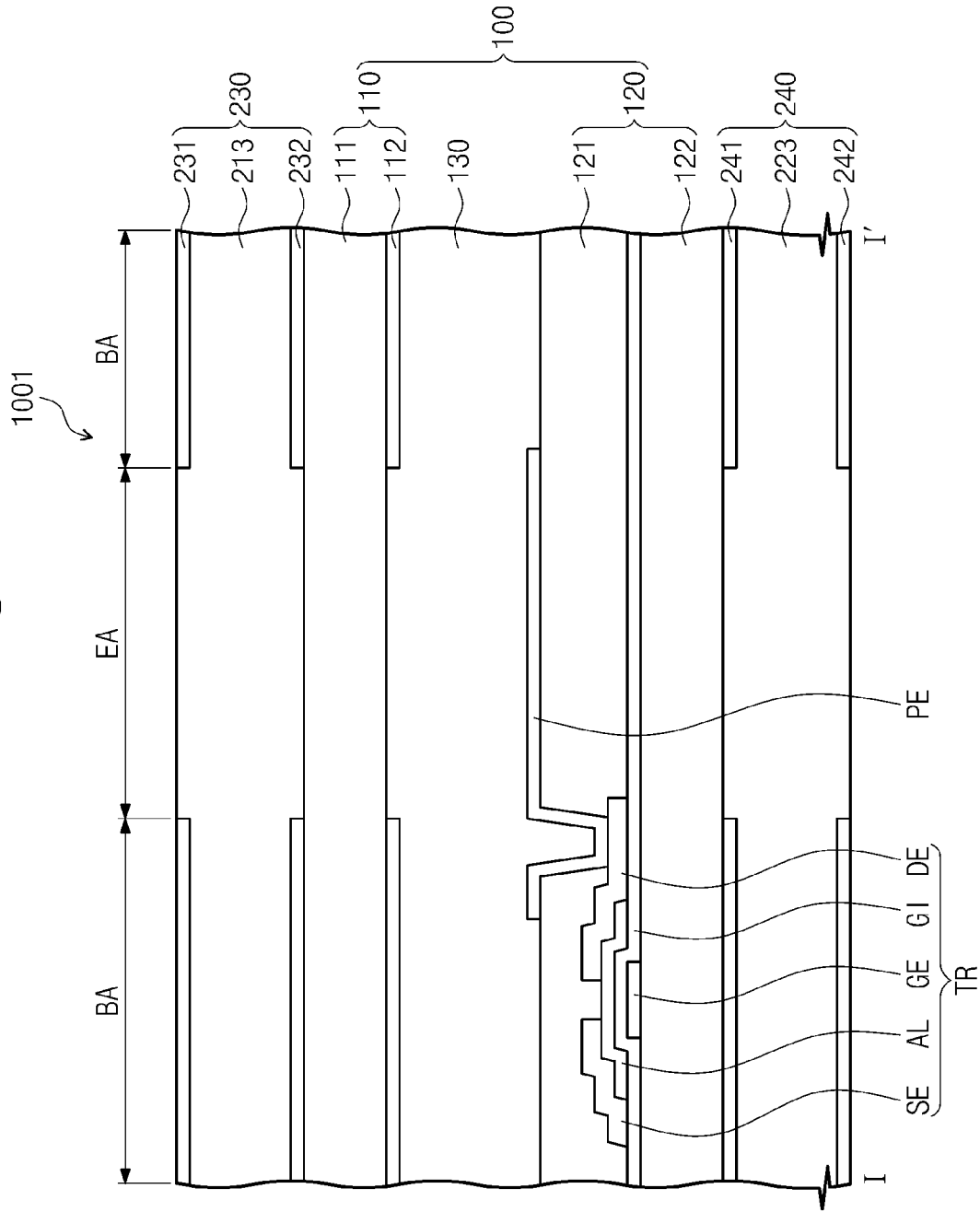

FLEXIBLE DISPLAY DEVICE AND CONTROL METHOD THEREOF

This application claims priority to Korean Patent Application No. 10-2014-0001958, filed on Jan. 7, 2014, and all the benefits accruing therefrom under 35 U.S.C. §119, the content of which in its entirety is herein incorporated by reference.

BACKGROUND

1. Field

Exemplary embodiments of the invention relate to a display device, and in particular, to a flexible display device.

2. Description of the Related Art

A display panel is widely used for electronic devices with image-displaying function, such as smartphones, digital cameras, laptop computers, navigation systems, and television sets, and so forth.

a flat display panel, such as a liquid crystal display panel, an organic light emitting display panel, a plasma display panel and an electrophoresis display panel, for example, are being widely used as the display panel due to thin and light-weight properties thereof.

Recently, a variety of technologies are being studied to develop a flexible display device having thin, lightweight, unbroken properties. Especially, the flexible display device may display images stably when applied or used in the flexible display device for various industry fields including information technology ("IT"), clothing, and paper-like media industries, due to its flexibility under an external force.

SUMMARY

Exemplary embodiments of the invention provide a flexible display device capable of providing a stable display property, even under the condition that there is an external force bending the flexible display device.

Other exemplary embodiments of the invention provide a method of controlling the flexible display device.

According to exemplary embodiments of the invention, a flexible display device may include a flexible display panel which displays an image, a strain gauge disposed in the flexible display panel, where the strain gauge senses a strain in the flexible display panel and generates a detection signal based on the sensed strain, a strain controller which receives the detection signal and outputs a strain compensation voltage based on the detection signal, and a strain compensation layer disposed on a surface of the flexible display panel and which receives the strain compensation voltage, where a thickness of the strain compensation layer may be controlled based on the strain compensation voltage such that a neutral plane of the flexible display device is maintained in a predetermined reference area in the flexible display panel.

In an exemplary embodiment, the strain compensation layer may include a strain compensation material, an upper electrode disposed on an outer surface of the strain compensation material, and a lower electrode disposed between the strain compensation material and the flexible display panel and opposite to the upper electrode.

In an exemplary embodiment, the strain compensation voltage may include an upper and lower voltages applied to the upper and lower electrodes, respectively, and the upper and lower voltages are different from each other.

In an exemplary embodiment, the flexible display device may further include a cover film which covers the strain compensation layer, and an adhesive layer disposed between and attached to the cover film and the strain compensation layer.

In an exemplary embodiment, the strain compensation layer may include a first compensation layer disposed on the flexible display panel and a second compensation layer disposed below the flexible display panel.

In an exemplary embodiment, the cover film may include a first film disposed on the flexible display panel and a second film disposed below the flexible display panel, and the adhesive layer may include a first layer interposed between and attached to the first film and the first compensation layer and a second layer interposed between and attached to the second film and the second compensation layers.

In an exemplary embodiment, the flexible display panel may include a pixel having a light-emitting area, and the upper and lower electrodes may be disposed in the light-emitting area, where at least one of the upper and lower electrodes may include a transparent conductive material.

In an exemplary embodiment, the flexible display panel may include a pixel having a black matrix area, in which a black matrix is disposed, and the upper and lower electrodes may be disposed in the black matrix area.

In an exemplary embodiment, the strain compensation layer may include a piezoelectric material, a dielectric elastomer or a combination thereof.

In an exemplary embodiment, the flexible display panel may further include a lower base substrate and a transistor disposed on the lower base substrate and including a semiconductor layer, and the reference area may be defined in a region between uppermost and lowermost surfaces of the semiconductor layer, when viewed from a transverse cross-sectional view of the flexible display panel.

In an exemplary embodiment, the flexible display panel may include a display area in which an image is displayed and a non-display area surrounding the display area, and the strain gauge may be disposed in the non-display area.

According to exemplary embodiments of the invention, a method of operating a flexible display device includes sensing a strain in a flexible display panel of the flexible display device to generate a detection signal, generating a strain compensation voltage based on the detection signal, and controlling a thickness of a strain compensation layer disposed on a surface of the flexible display panel using the strain compensation voltage, where the thickness of the strain compensation layer is controlled to allow a neutral plane of the flexible display device to be in a predetermined reference area in the flexible display panel.

In an exemplary embodiment, the strain compensation layer may be disposed on the flexible display panel. In such an embodiment, the strain compensation voltage may increase a thickness of the strain compensation layer, when the neutral plane is positioned at a level higher than the reference area, and the strain compensation voltage may decrease the thickness of the strain compensation layer, when the neutral plane is positioned at a level lower than the reference area.

In an exemplary embodiment, the strain compensation layer may be disposed below the flexible display panel. In such an embodiment, the strain compensation voltage decrease a thickness of the strain compensation layer, when the neutral plane is positioned at a level higher than the reference area, and the strain compensation voltage may increase the thickness of the strain compensation layer, when the neutral plane is positioned at a level lower than the reference area.

In an exemplary embodiment, the strain compensation layer may include a first compensation layer disposed on the flexible display panel and a second compensation layer disposed below the flexible display panel, and the generating of the strain compensation voltage may include generating first and second strain compensation voltages, which control thicknesses of the first and second compensation layers, respectively.

In an exemplary embodiment, the first and second strain compensation voltages may increase the thickness of the first compensation layer and decrease the thickness of the second compensation layer, when the neutral plane is positioned at a level higher than the reference area, and the first and second strain compensation voltages may decrease the thickness of the first compensation layer and increase the thickness of the second compensation layer, when the neutral plane is positioned at a level lower than the reference area.

BRIEF DESCRIPTION OF THE DRAWINGS

The above and other features of exemplary embodiments of the invention will become readily apparent by reference to the following detailed description when considered in conjunction with the accompanying drawings, in which:

FIG. 9 is a sectional view illustrating another alternative exemplary embodiment of a flexible display device according to the invention.

DETAILED DESCRIPTION

Figure 1:
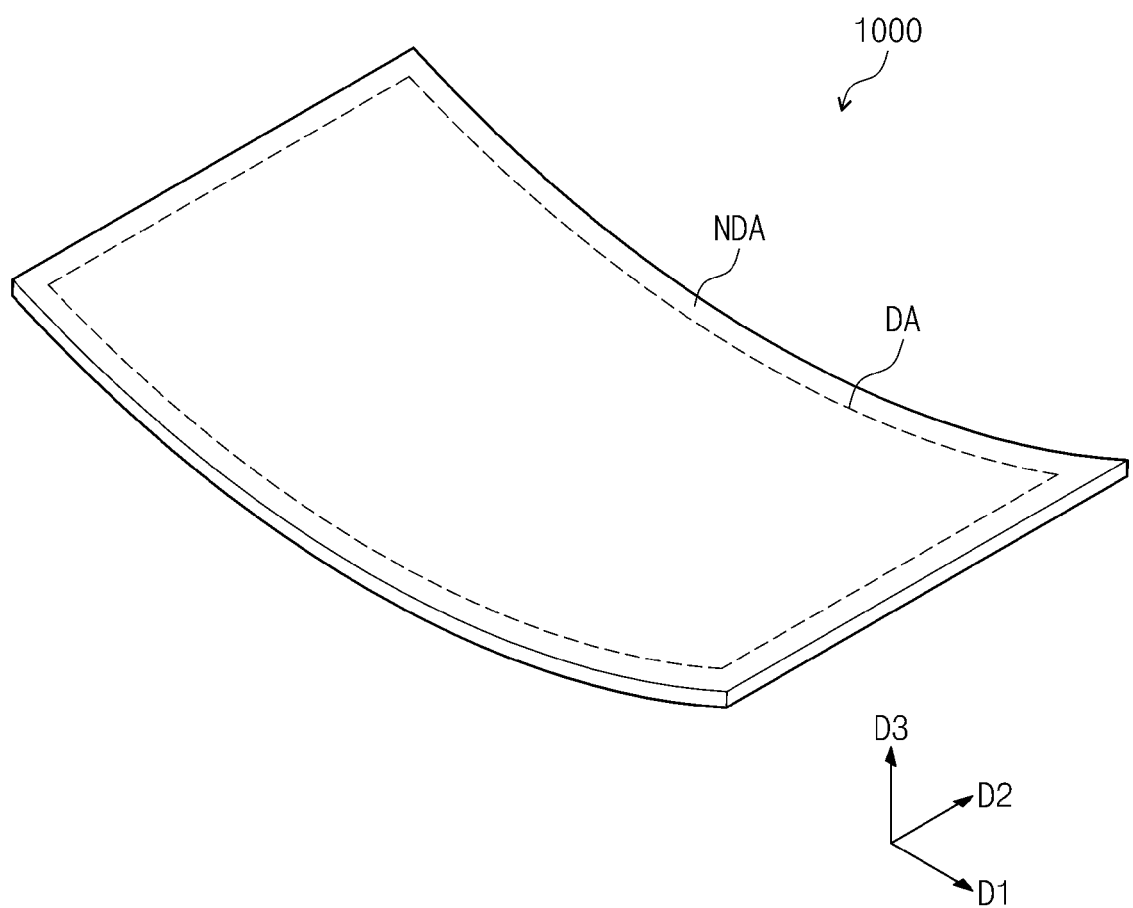
FIG. 1 is a perspective view illustrating an exemplary embodiment of a flexible display device according to the invention.

The inventions will now be described more fully with reference to the accompanying drawings, in which various embodiments are shown. Exemplary embodiments of the inventions may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "on", "connected" or "coupled" to another element, it can be directly on, connected or coupled to the other element or intervening elements may be present. In contrast, when an element is referred to as being "directly on," "directly connected" or "directly coupled" to another element, there are no intervening elements present.

It will be understood that, although the terms "first", "second", "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which exemplary embodiments of the inventions belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected.

Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
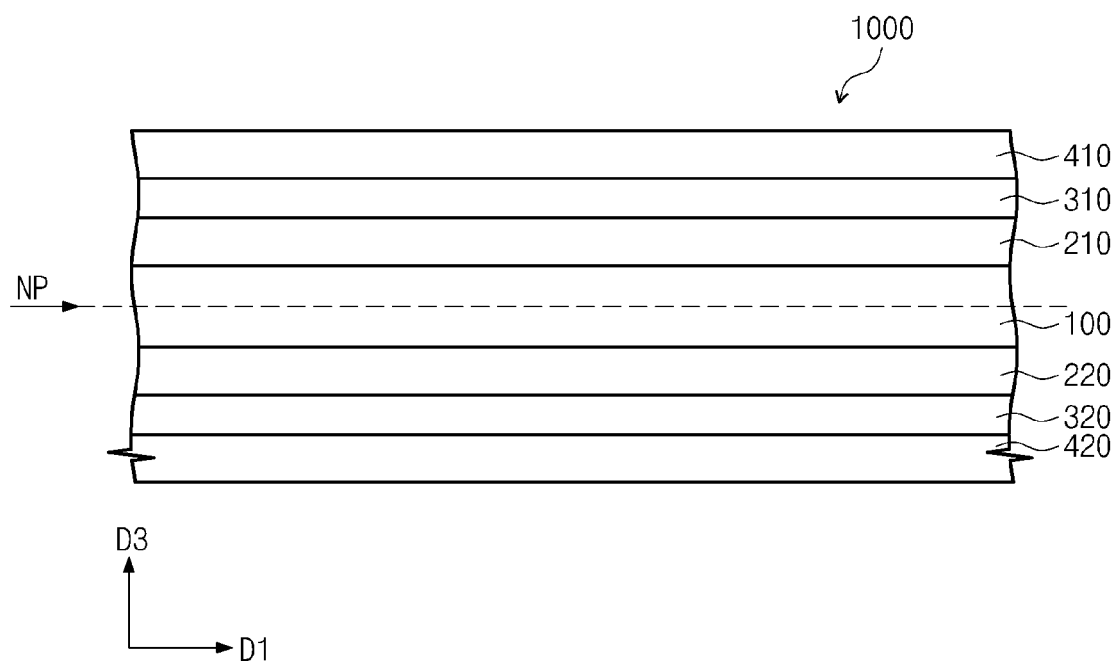
FIG. 2 is a sectional view of the flexible display device shown in FIG. 1.

FIG. 1 is a perspective view illustrating an exemplary embodiment of a flexible display device 1000 according to the invention, and FIG. 2 is a sectional view of the flexible display device 1000 shown in FIG. 1.

Referring to FIGS. 1 and 2, an exemplary embodiment of the flexible display device 1000 may include a flexible display panel 100, a strain compensation layer, an adhesive layer and a cover film.

The flexible display device 1000 may be provided in the form of a rectangular plate including a pair of sides substantially parallel to a first direction D1 and another pair of sides substantially parallel to a second direction D2 or substantially perpendicular to the first direction D1. In an exemplary embodiment, the shape or structure of the flexible display device 1000 may be variously modified.

The flexible display device 1000 may display visual information, such as text, video, picture, two-dimensional image or three-dimensional image. The flexible display device 1000 may include a display area DA and a non-display area NDA adjacent to or around the display area DA. The display area DA may be provided on a surface of the flexible display device 1000 and have about a rectangular shape. In such an embodiment of the flexible display device 1000, images may be displayed through the display area DA.

The flexible display device 1000 may include elements stacked substantially in a third direction D3 perpendicular to both of the first and second directions D1 and D2. In one exemplary embodiment, for example, the flexible display device 1000 may include the flexible display panel 100, the strain compensation layer, the adhesive layer and the cover film.

In an exemplary embodiment, as shown in FIG. 2, the strain compensation layer may include a first compensation layer 210 and a second compensation layer 220. The first compensation layer 210 may be disposed on a top surface of the flexible display panel 100, and the second compensation layer 220 may be disposed on a bottom surface of the flexible display panel 100.

The cover film may include a first film 410 and a second film 420. The first film 410 may be disposed on the first compensation layer 210, and the second film 420 may be disposed on the second compensation layer 220. The first film 410 may be provided to cover the first compensation layer 210, and the second film 420 may be provided to cover the second compensation layer 220.

The adhesive layer may include a first layer 310 and a second layer 320. The first layer 310 may be disposed between the first film 410 and the first compensation layer 210, and the second layer 320 may be disposed between the second film 420 and the second compensation layer 220.

The flexible display device 1000 may be flexible or configured to be bent by an external force. In one exemplary embodiment, For example, the flexible display device 1000 may be bent in the first direction D1, as shown in FIG. 1. The bending of the flexible display device 1000 may lead to deformation of the flexible display panel 100, the first and second compensation layers 210 and 220, the first and second layers 310 and 320 of the adhesive layer, and the first and second films 410 and 420 of the cover film. Such a deformation may be quantified by measuring a strain thereof. Here, the strain is a physical quantity indicating an extent of a deformation of an object from its initial structure, when an external force is applied to the object. In such an embodiment of the flexible display panel 100, the strain may vary depending on a position in the third direction D3. In such an embodiment, the strain may vary depending on a relative position of each of the stacked elements in the flexible display device 1000, when viewed in the third direction D3. Accordingly, strains exerted to the stacked elements may be different from each other.

The flexible display device 1000 may have a neutral plane NP, to which no strain is exerted. The neutral plane NP may extend substantially parallel to a surface or side of the flexible display device 1000. When viewed in a sectional view, a position of the neutral plane NP may be moved along the third direction D3, depending on thicknesses and elastic moduli of the stacked elements.

Figure 3:
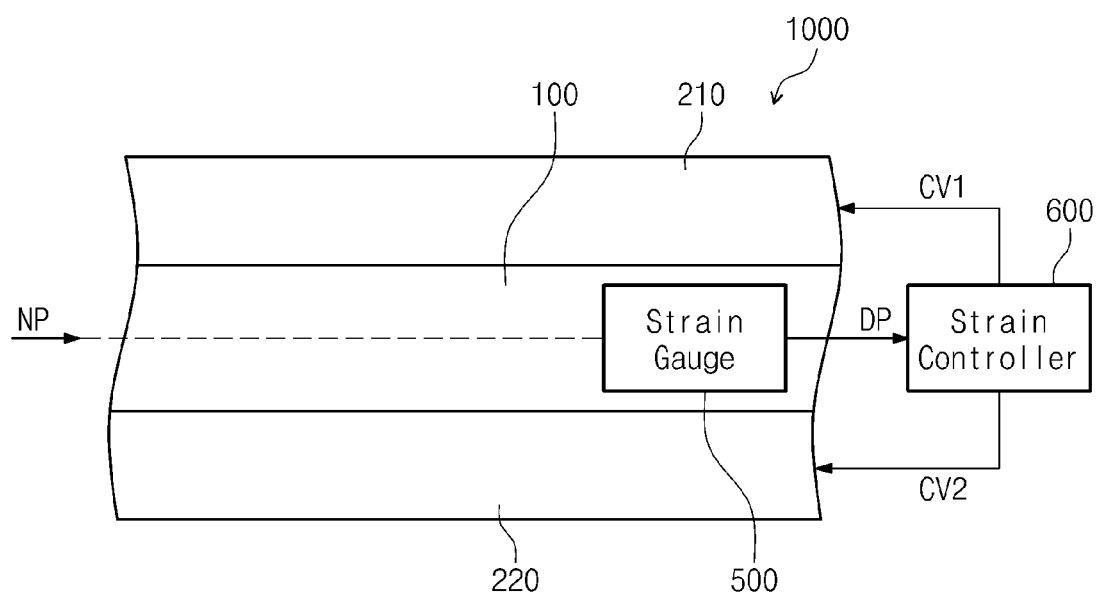
FIG. 3 is a schematic diagram illustrating an exemplary embodiment of a flexible display device according to the invention.

FIG. 3 is a schematic diagram illustrating an exemplary embodiment of the flexible display device 1000 according to the invention.

Referring to FIG. 3, an exemplary embodiment of the flexible display device 1000 may further include a strain gauge 500 and a strain controller 600.

The strain gauge 500 may be provided in the flexible display panel 100. In such an embodiment, when the flexible display panel 100 is deformed by an external force, the strain gauge 500 may be configured to sense or detect whether a strain occurs in the flexible display panel 100.

In such an embodiment, the strain gauge 500 may produce a detection signal DP based on the sensed or detected strain of the flexible display panel 100.

The strain controller 600 may receive the detection signal DP. The strain controller 600 may generate first and second strain compensation voltages CV1 and CV2, based on the detection signal DP. The first and second strain compensation voltages CV1 and CV2 may be provided to the first and second compensation layers 210 and 220, respectively.

A thickness of the first compensation layer 210 may be controlled by the first strain compensation voltage CV1, and a thickness of the second compensation layer 220 may be controlled by the second strain compensation voltage CV2. The change in thickness of the first and second compensation layers 210 and 220 may result in a change in position of the neutral plane NP.

Hereinafter, an operation of an exemplary embodiment of the flexible display device 1000 will be described with reference to FIGS. 4A and 4B.

Figure 4A:
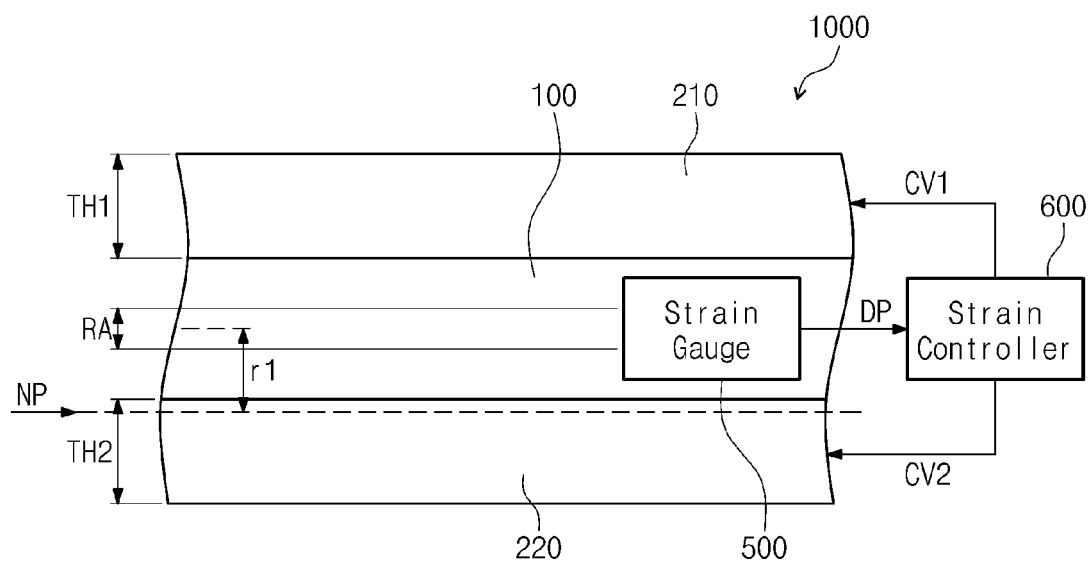
FIGS. 4A and 4B are schematic diagrams illustrating an operation of an exemplary embodiment of a flexible display device according to the invention.
Figure 4B:
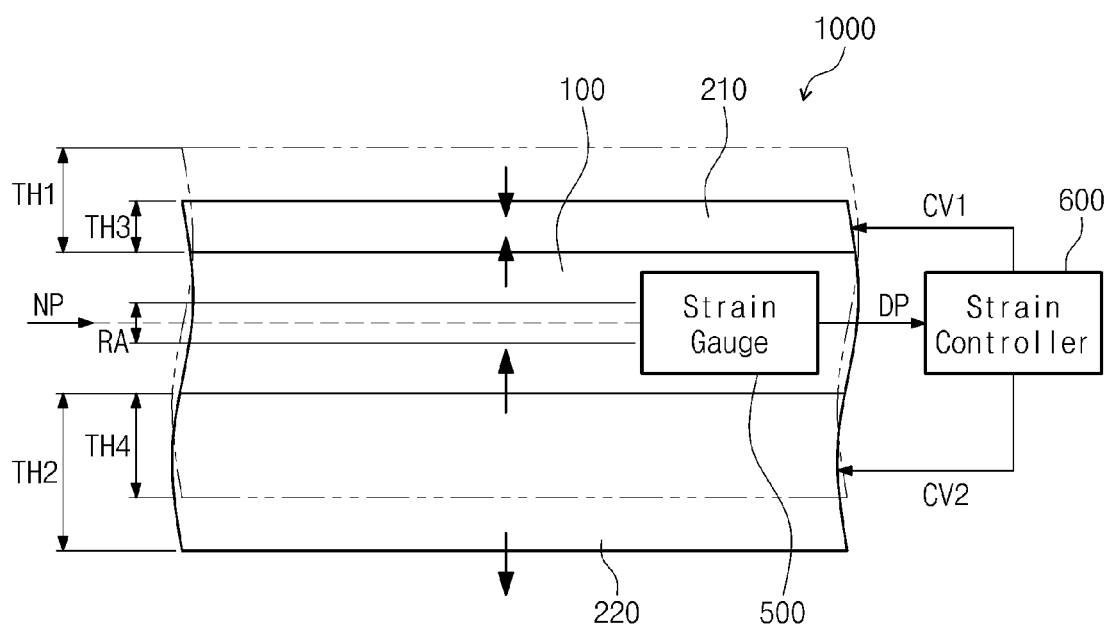

FIGS. 4A and 4B are schematic diagrams illustrating an operation of an exemplary embodiment of a flexible display device according to the invention.

Referring to FIGS. 4A and 4B, an exemplary embodiment of the flexible display device 1000 may be configured in such a way that the neutral plane NP is positioned at a reference area RA using the first and second compensation layers 210 and 220.

The reference area RA may be predetermined in the flexible display panel 100. The reference area RA may be configured to have a predetermined thickness in the third direction D3. The flexible display panel 100 may include an electronic device (e.g., a transistor TR shown in FIG. 7). The electronic device and the reference area RA will be described in greater detail with reference to FIG. 7.

In an exemplary embodiment of the flexible display panel 100, the presence of strain may lead to deterioration in electric property of the electronic device and consequently deterioration in display quality of the flexible display device 1000. Accordingly, in such an embodiment, the neutral plane NP is maintained to be positioned in the reference area RA to prevent the electric property of the electronic device from being deteriorated.

As the flexible display device 1000 is repeatedly deformed or physical properties of the stacked elements therein become changed, the position of the neutral plane NP may be moved outside of the reference area RA. As time goes on, elasticity and viscosity of the first and second layers 310 and 320 of the adhesive layer may be changed, such that the neutral plane NP may be changed. In one exemplary embodiment, for example, the neutral plane NP may be changed to be located at a level spaced apart from the center of the reference area RA by a first distance r1 in a downward direction. When the neutral plane NP is deviated from the flexible display panel 100, and a first strain, which is given by a function of the first distance r1, may exert to the reference area RA.

In such an embodiment, the strain gauge 500 may measure the first strain and generate a detection signal DP based on the measured magnitude of the first strain.

The strain controller 600 may receive the detection signal DP and generate the first and second strain compensation voltages CV1 and CV2 based on the detection signal DP. The first and second strain compensation voltages CV1 and CV2 may have levels, which are selected from a predetermined table based on the measured magnitude of the first strain.

In an exemplary embodiment, the first compensation layer 210 may initially have a first thickness TH1. In such an embodiment, when the first strain compensation voltage CV1 is applied to the first compensation layer 210, the thickness of the first compensation layer 210 may be decreased to a third thickness TH3 that is smaller than the first thickness TH1.

In an exemplary embodiment, the second compensation layer 220 may initially have a second thickness TH2. In such an embodiment, when the second strain compensation voltage CV2 is applied to the second compensation layer 220, the thickness of the second compensation layer 220 may be increased to a fourth thickness TH4 that is larger than the second thickness TH2.

In an exemplary embodiment, when the first and second compensation layers 210 and 220 are adjusted to have the third and fourth thicknesses TH3 and TH4, the position of the neutral plane NP may be moved to the center of the reference area RA.

In an exemplary embodiment, where the neutral plane NP is positioned below the reference area RA, the neutral plane NP may be moved toward the center of the reference area RA using the method described with reference to FIGS. 4A and 4B. Hereinafter, an operation of an exemplary embodiment of the flexible display device 1000 when the neutral plane NP is positioned above the reference area RA will be described in greater detail with reference to FIGS. 5A and 5B.

Figure 5A:
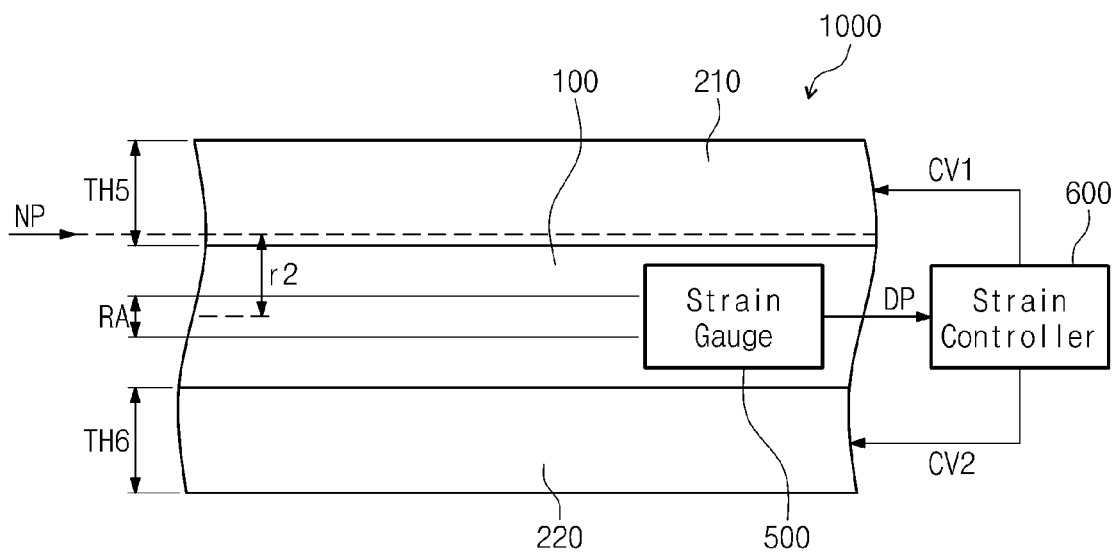
FIGS. 5A and 5B are schematic diagrams illustrating an operation of an exemplary embodiment of a flexible display device according to the invention.
Figure 5B:
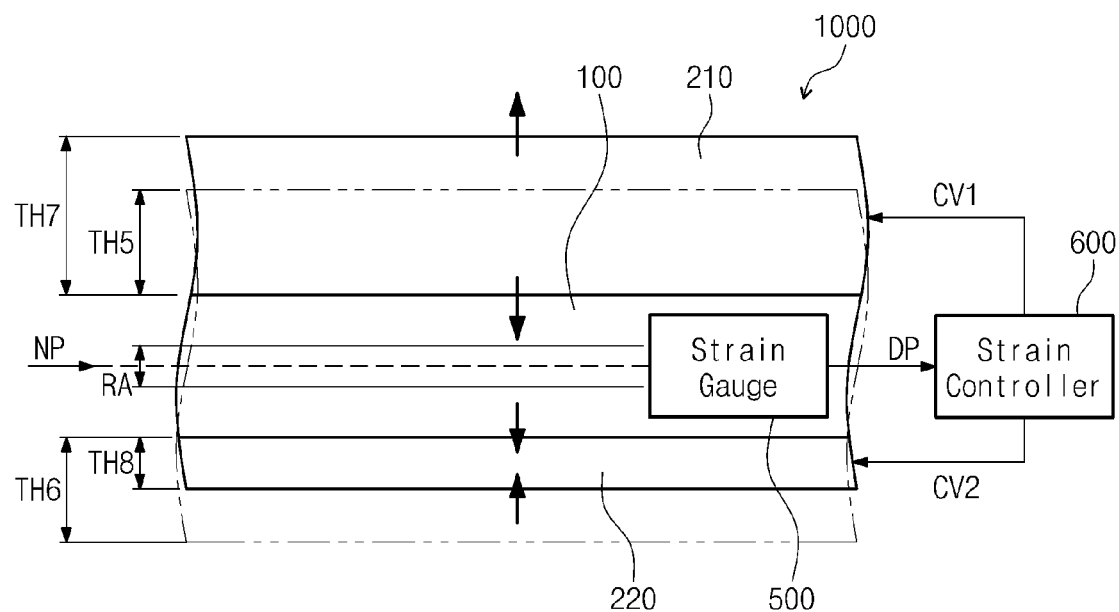

FIGS. 5A and 5B are schematic diagrams illustrating an operation of an exemplary embodiment of a flexible display device according to the invention.

Referring to FIGS. 5A and 5B, in an exemplary embodiment where the neutral plane NP is located at a level spaced apart from the center of the reference area RA by a second distance r2 in an upward direction, the thicknesses of the first and second compensation layers 210 and 220 in the flexible display device 1000 may be adjusted in such a way that the neutral plane NP is located in the reference area RA. When the neutral plane NP is located at the level spaced apart from the center of the reference area RA by the second distance r2 in the upward direction, a second strain, which is given by a function of the second distance r2, may exert to the reference area RA.

The strain gauge 500 may measure the second strain and generate a detection signal DP based on the measured magnitude of the second strain.

The strain controller 600 may generate the first and second strain compensation voltages CV1 and CV2 in response to the second strain. The first and second strain compensation voltages CV1 and CV2 may have levels, which are selected from a predetermined table based on the measured magnitude of the second strain.

In such an embodiment, the first compensation layer 210 may initially have a fifth thickness TH5. In such an embodiment, when the first strain compensation voltage CV1 is applied to the first compensation layer 210, the thickness of the first compensation layer 210 may be increased to a seventh thickness TH7 that is larger than the fifth thickness TH5.

In such an embodiment, the thickness of the second compensation layer 220 may initially have a sixth thickness TH6. In such an embodiment, when the second strain compensation voltage CV2 is applied to the second compensation layer 220, the thickness of the second compensation layer 220 may be decreased to an eighth thickness TH8 that is smaller than the sixth thickness TH6.

In an exemplary embodiment, where the first and second compensation layers 210 and 220 are adjusted to have the seventh and eighth thicknesses TH7 and TH8, the position of the neutral plane NP may be moved to the center of the reference area RA.

As described above, in an exemplary embodiment, the flexible display device 1000 may be configured to adjust the position of the neutral plane NP defined therein to be positioned in the reference area RA using the strain gauge 500, the strain controller 600 and the first and second compensation layers 210 and 220. Accordingly, in such an embodiment, a strain is effectively prevented from being exerted to an electronic device (e.g., the transistor TR) of the flexible display panel 100, and the electric property of the electronic device is thereby effectively prevented from being deteriorated. As a result, even when the flexible display device 1000 is bent by an external force, the flexible display device 1000 may display images stably.

According to the exemplary embodiments described above, the strain compensation layer may include the first and second compensation layers 210 and 220 disposed on two opposite surfaces, respectively, of the flexible display panel 100, but exemplary embodiments of the invention may not be limited thereto. In alternative exemplary embodiments, the structure of the strain compensation layer may be variously modified. The strain compensation layer may include only one of the first and second compensation layers 210 and 220.

Figure 6:
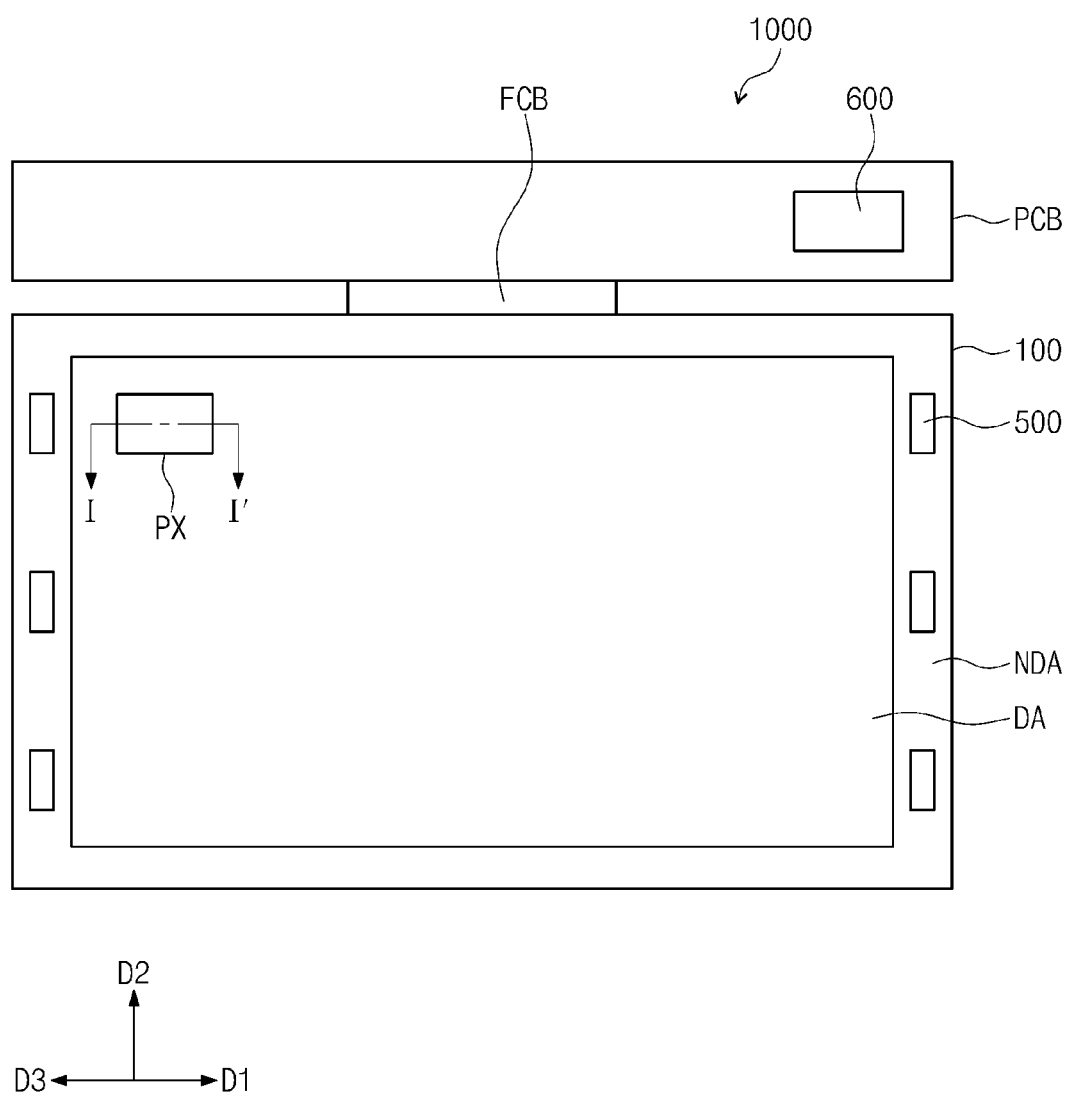
FIG. 6 is a plan view illustrating an alternative exemplary embodiment of a flexible display device according to the invention.
Figure 7:
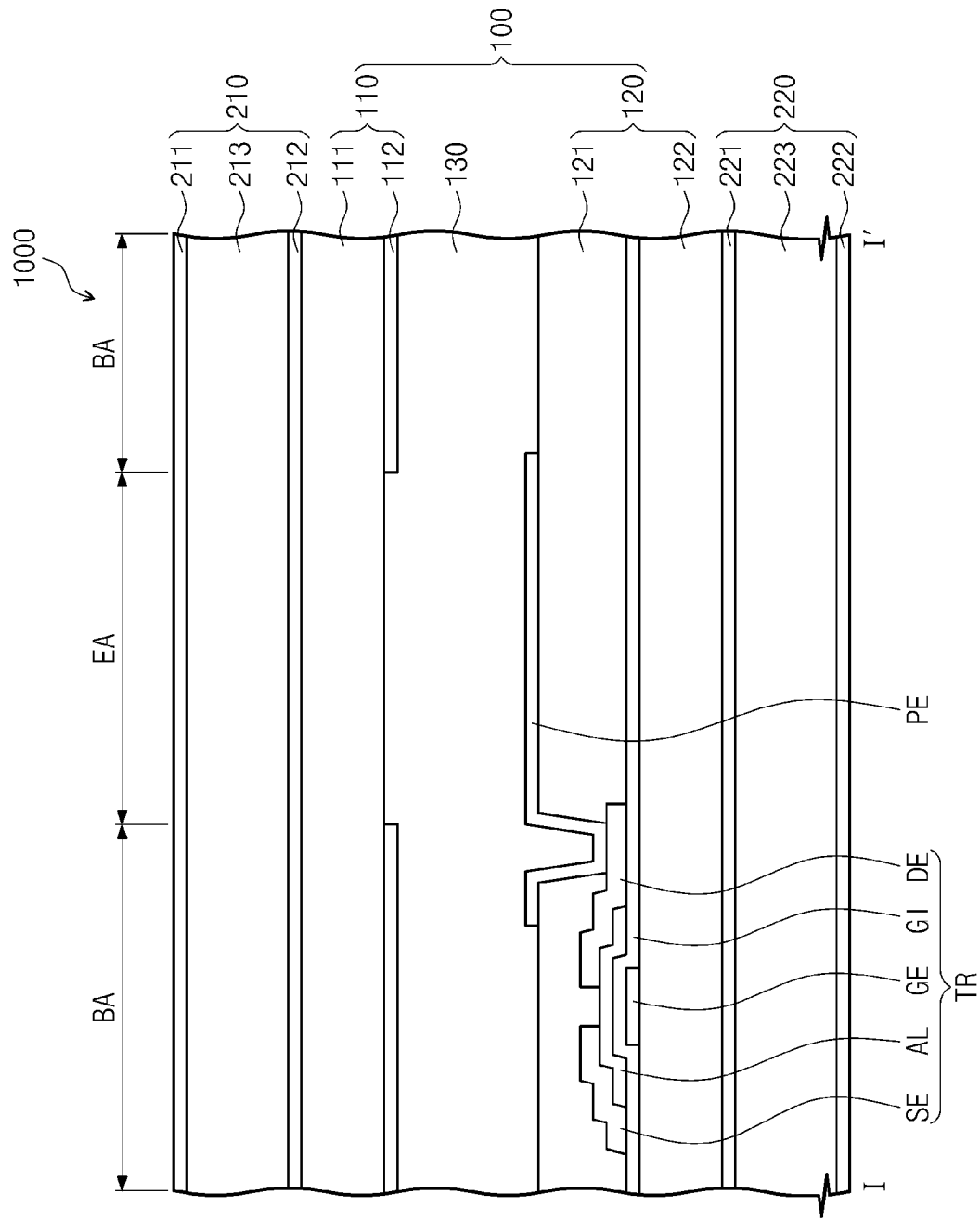
FIG. 7 is a sectional view taken along line I-I' of the flexible display device of FIG. 6.
Figure 8:
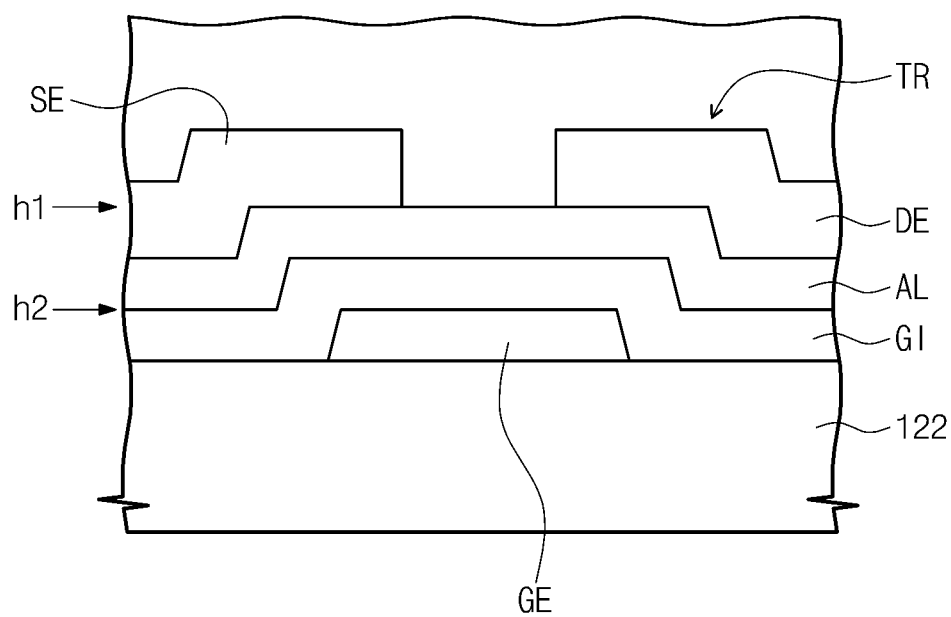
FIG. 8 is an enlarged sectional view illustrating an exemplary embodiment of a transistor shown in FIG. 7.

FIG. 6 is a plan view illustrating an exemplary embodiment of a flexible display device according to the invention, and FIG. 7 is a sectional view taken along line I-I' of the flexible display device of FIG. 6. FIG. 8 is an enlarged sectional view illustrating an exemplary embodiment of a transistor shown in FIG. 7.

Referring to FIGS. 6 and 7, an exemplary embodiment of the flexible display device 1000 may further include a printed circuit board PCB and a flexible circuit board FCB.

The printed circuit board PCB may provide a driving signal to the flexible display panel 100, and the flexible circuit board FCB may connect the printed circuit board PCB to the flexible display panel 100.

The strain controller 600 may be disposed in the printed circuit board PCB.

The flexible display device 1000 may include a plurality of the strain gauges 500 provided in the non-display area NDA. In one exemplary embodiment, for example, three strain gauges 500 may be arranged along the second direction D2 in each of two opposite portions of the non-display area NDA, which are located in the first and third directions D1 and D3 relative to the display area DA. Each of the strain gauges 500 may be configured to sense or detect whether a strain occurs at a position near thereto.

Each strain gauge 500 may include an electrical or mechanical strain gauge. The electrical strain gauge may include a resistant material attached to an object. If the object is deformed, the electrical strain gauge may be deformed along with the object. Electric resistance of the resistant material may be changed depending on a degree of the deformation of the electrical strain gauge. In the electrical strain gauge, such a change in electric resistance of the resistance material may be used to measure the strain.

The flexible display panel 100 may include a plurality of pixels PX provided in the display area DA to display an image. Each of the pixels PX may include the transistor TR and a pixel electrode PE.

For convenience of illustration and description, some elements constituting the flexible display device 1000 are omitted in the sectional view of FIG. 7.

In an exemplary embodiment, as shown in FIG. 7, the flexible display panel 100 may include a top plate 110, a bottom plate 120 and a light control layer 130.

The top plate 110 may include an upper base substrate 111 and a black matrix 112. The upper base substrate 111 may be formed of or include a material with high optical transmittance and high flexibility to serve as a base of the top plate 110. The upper base substrate 111 may be formed of or include a plastic material.

In an exemplary embodiment, the flexible display device 1000 may include a black matrix area BA and an emitting area EA. In such an embodiment, the black matrix 112 may be disposed on the black matrix area BA of the upper base substrate 111 to effectively prevent light from being incident into the black matrix area BA. In an exemplary embodiment, the black matrix 112 may be formed of a material that blocks light.

The bottom plate 120 may include a lower base substrate 122, the transistor TR, an insulating layer 121 and the pixel electrode PE.

The lower base substrate 122 may be formed of or include a material with high optical transmittance and high flexibility to serve as a base of the bottom plate 120. In an exemplary embodiment, the lower base substrate 122 may be formed of the same material (e.g., a plastic material) as the upper base substrate 111.

The transistor TR may be disposed in the black matrix area BA and on the lower base substrate 122.

The transistor TR may include a gate electrode GE, a gate insulating layer GI, a semiconductor layer AL, a source electrode SE and a drain electrode DE. The gate electrode GE may be disposed on the lower base substrate 122. The gate insulating layer GI may separate the semiconductor layer AL electrically from the gate electrode GE. The semiconductor layer AL may be disposed on the gate electrode GE with the gate insulating layer GI interposed therebetween. The source electrode SE may be in contact with the semiconductor layer AL, and the drain electrode DE may be spaced apart from the source electrode SE and in contact with the semiconductor layer AL.

The insulating layer 121 may be disposed on the transistor TR. The insulating layer 121 may include or be formed of an inorganic material and/or an organic matter.

A contact hole may be defined or formed in the insulating layer 121 to expose the drain electrode DE through the insulating layer 121. The contact hole may be formed in the black matrix area BA.

The pixel electrode PE may be disposed on at least a portion of the black matrix area BA and the emitting area EA and be electrically connected to the drain electrode DE through the contact hole. The pixel electrode PE may include or be formed of a transparent conductive material with flexibility.

The light control layer 130 may include, for example, an organic light emitting layer or a liquid crystal layer. An intensity of light emitted from or through the light control layer 130 may be controlled by the pixel electrode PE and a counter electrode (not shown) opposite thereto or by an electric field generated by the pixel and counter electrodes.

In an exemplary embodiment, where the strain gauge 500 includes the electric strain gauge, the electric strain gauge may be provided or formed in the flexible display panel 100 during a process of fabricating the flexible display panel 100. In one exemplary embodiment, for example, the electric strain gauge may be provided or formed using one of processes of providing the gate electrode GE, source electrode SE and the pixel electrode PE.

The first compensation layer 210 may include a first upper electrode 211, a first lower electrode 212 and a first strain compensation material 213.

The first strain compensation material 213 may be disposed on the upper base substrate 111, and the first lower electrode 212 may be interposed between the first strain compensation material 213 and the upper base substrate 111. In an exemplary embodiment, the first lower electrode 212 may cover the whole area in the first strain compensation material 213 and/or the upper base substrate 111. The first upper electrode 211 may be disposed to cover the first strain compensation material 213. The first strain compensation material 213 may be interposed between the first upper electrode 211 and the first lower electrode 212. In an exemplary embodiment, the first strain compensation material 213 may cover the whole area in the first upper electrode 211 and/or the first lower electrode 212.

The first strain compensation material 213 may include or be formed of a material, a thickness of which is changed or controlled based on an electric field applied thereto. In one exemplary embodiment, for example, the first strain compensation material 213 may include a piezoelectric material or a dielectric elastomer.

The first upper and lower electrodes 211 and 212 may include or be formed of transparent conductive materials with flexibility. Each of the first upper and lower electrodes 211 and 212 may be electrically connected to the strain controller 600. In an exemplary embodiment, the first strain compensation voltage CV1 (of FIG. 3) may be a first upper voltage or a first lower voltage different from the first upper voltage. The first upper electrode 211 may receive the first upper voltage from the strain controller 600, and the first lower electrode 212 may receive the first lower voltage from the strain controller 600.

When the first upper electrode 211 is applied with the first upper voltage and the first lower electrode 212 is applied with the first lower voltage, a first electric field may be generated in the first strain compensation material 213. A magnitude of the first electric field may be substantially proportional to a potential difference between the first upper and lower voltages, and a direction of the first electric field may be substantially parallel to a thickness direction of the first strain compensation material 213. The thickness of the first strain compensation material 213 may be changed or controlled based on the first electric field.

The second compensation layer 220 may include a second upper electrode 221, a second lower electrode 222 and a second strain compensation material 223.

The second strain compensation material 223 may be disposed below the lower base substrate 122, and the second upper electrode 221 may be interposed between the second strain compensation material 223 and the lower base substrate 122. In an exemplary embodiment, the second upper electrode 221 may cover the whole area of a surface of the lower base substrate 122 or the second strain compensation material 223. The second lower electrode 222 may be disposed to cover the second strain compensation material 223. The second strain compensation material 223 may be interposed between the second lower electrode 222 and the second upper electrode 221. In an exemplary embodiment, the second strain compensation material 223 may cover the whole area of a surface of the second upper electrode 221 and/or the second lower electrode 222.

The second strain compensation material 223 may include or be formed of a material, a thickness of which is changed or controlled based on an electric field applied thereto. In one exemplary embodiment, for example, the second strain compensation material 223 may include a piezoelectric material or a dielectric elastomer.

The second upper or lower electrodes 221 or 222 may include or be formed of a transparent conductive material with flexibility. Each of the second upper and lower electrodes 221 and 222 may be electrically connected to the strain controller 600. The second strain compensation voltage CV2 (of FIG. 3) may be a second upper voltage and a second lower voltage different from the second upper voltage. The second upper electrode 221 may receive the second upper voltage from the strain controller 600, and the second lower electrode 222 may receive the second lower voltage from the strain controller 600.

When the second upper electrode 221 is applied with the second upper voltage and the second lower electrode 222 is applied with the second lower voltage, a second electric field may be generated in the second strain compensation material 223. A magnitude of the second electric field may be substantially proportional to a potential difference between the second upper and lower voltages, and a direction of the second electric field may be substantially parallel to a thickness direction of the second strain compensation material 223. In such an embodiment, the thickness of the second strain compensation material 223 may be changed or controlled based on the second electric field.

As described above, in an exemplary embodiment, the strain controller 600 may be configured to control the thicknesses of the first and second strain compensation material 213 and 223 using at least one of the first and second electric fields to maintain the position of the neutral plane NP to be in the reference area RA.

The reference area RA will be described in greater detail with reference to FIG. 8. When a strain is exerted to the transistor TR, the transistor TR may have a changed operation or threshold voltage. Accordingly, the reference area RA may be defined in a predetermined region where the neutral plane NP is positioned to effectively prevent the strain from occurring in the transistor TR. In an exemplary embodiment, the reference area RA may be set based on a position of the semiconductor layer AL. In one exemplary embodiment, for example, when viewed from a transverse cross-sectional view of the flexible display panel, that is, a sectional view in a vertical direction from the lower base substrate 122, the reference area RA may be defined to be a region between the uppermost and lowermost surfaces, i.e., h1 and h2, of the semiconductor layer AL. In an exemplary embodiment, where the neutral plane NP is controlled or maintained to be positioned in the reference area RA, a strain is effectively prevented from occurring in the semiconductor layer AL, thereby effectively preventing electric characteristics of the transistor TR from being changed due to the strain.

FIG. 9 is a sectional view illustrating an alternative exemplary embodiment of a flexible display device according to the invention.

Referring to FIG. 9, an exemplary embodiment of a flexible display device 1001 may include a first compensation layer 230 and a second compensation layer 240. In such an embodiment, the flexible display device 1001 may be configured to have substantially the same features as the flexible display device 1000 of FIG. 7 except for the first and second compensation layers 230 and 240. The same or like elements shown in FIG. 9 have been labeled with the same reference characters as used above to describe the exemplary embodiment of the flexible display device 1000 shown in FIG. 7, and any repetitive detailed description thereof will hereinafter be omitted or simplified.

The first compensation layer 230 may include a first upper electrode 231, a first lower electrode 232 and the first strain compensation material 213.

The first lower electrode 232 may be disposed in the black matrix area BA and on a top surface of the upper base substrate 111. The first strain compensation material 213 may cover the upper base substrate 111 and the first lower electrode 232. The first upper electrode 231 may be disposed in the black matrix area BA and on the first strain compensation material 213. Accordingly, the first lower electrode 232, the first strain compensation material 213 and the first upper electrode 231 may be sequentially stacked one another 111 in the black matrix area BA on the upper base substrate, while only the first strain compensation material 213 may be disposed in the emitting area EA on the upper base substrate 111.

The first upper or lower electrodes 231 or 232 may include or be formed of a conductive material. In one exemplary embodiment, for example, the first upper and lower electrode 231 and 232 may include or be formed of a semitransparent or opaque material (e.g., a relatively thick metallic layer). In such an embodiment, the first upper or lower electrodes 231 or 232 may include or be formed of a flexible material.

Each of the first upper and lower electrodes 231 and 232 may be electrically connected to the strain controller 600. The first upper electrode 231 may receive the first upper voltage from the strain controller 600, and the first lower electrode 232 may receive the first lower voltage from the strain controller 600.

When the first upper electrode 231 is applied with the first upper voltage and the first lower electrode 232 is applied with the first lower voltage, a first electric field may be generated in the first strain compensation material 213 in the black matrix area BA. A magnitude of the first electric field may be substantially proportional to a potential difference between the first upper and lower voltages, and a direction of the first electric field may be substantially parallel to a thickness direction of the first strain compensation material 213. In such an embodiment, the thickness of the first strain compensation material 213 may be changed or controlled based on the first electric field in the black matrix area BA.

The second compensation layer 240 may include a second upper electrode 241, a second lower electrode 242 and the second strain compensation material 223.

The second upper electrode 241 may be disposed in the black matrix area BA and on a bottom surface of the lower base substrate 122. The second strain compensation material 223 may be disposed to cover the lower base substrate 122 and the second upper electrode 241. The second lower electrode 242 may be disposed in the black matrix area BA and on the second strain compensation material 223. Accordingly, in such an embodiment, the second upper electrode 241, the second strain compensation material 223 and the second lower electrode 242 may be sequentially stacked one on anther in the black matrix area BA below the lower base substrate 122, while only the second strain compensation material 223 may be disposed in the emitting area EA below the lower base substrate 122.

The second upper or lower electrodes 241 or 242 may include or be formed of a conductive material. For example, the second upper and lower electrodes 241 and 242 may be formed of a semitransparent or opaque material (e.g., a relatively thick metallic layer). Further, the second upper or lower electrodes 241 or 242 may include or be formed of a flexible material.

Each of the second upper and lower electrodes 241 and 242 may be electrically connected to the strain controller 600. The second upper electrode 241 may receive the second upper voltage from the strain controller 600, and the second lower electrode 242 may receive the second lower voltage from the strain controller 600.

When the second upper electrode 241 is applied with the second upper voltage and the second lower electrode 242 is applied with the second lower voltage, a second electric field may be generated in the second strain compensation material 223 in the black matrix area BA. A magnitude of the second electric field may be substantially proportional to a potential difference between the second upper and lower voltages, and a direction of the second electric field may be substantially parallel to a thickness direction of the second strain compensation material 223. In such an embodiment, the thickness of the second strain compensation material 223 in the black matrix area BA may be changed or controlled based on the second electric field.

As described above, in an exemplary embodiment, the strain controller 600 may be configured to control the thicknesses of the first and second strain compensation material 213 and 223 in the black matrix area BA using at least one of the first and second electric fields, such that the position of the neutral plane NP is maintained in a predetermined region in the reference area RA.

In an exemplary embodiment, as shown in FIG. 9, the first upper and lower electrodes 231 and 232 and the second upper and lower electrodes 241 and 242 may not be disposed in the emitting area EA such that brightness reduction in light emitted from or through the light control layer 130 by the first upper and lower electrodes 231 and 232 and the second upper and lower electrodes 241 and 242 may be effectively prevented.

In such an embodiment, where the first upper and lower electrodes 231 and 232 and the second upper and lower electrodes 241 and 242 are disposed in only the black matrix area BA, the first upper and lower electrodes 231 and 232 and the second upper and lower electrodes 241 and 242 may include or be formed of an opaque material. Accordingly, each of the first upper and lower electrodes 231 and 232 and the second upper and lower electrodes 241 and 242 may include or be formed of a conductive material having electric characteristics superior to transparent conductive materials.

According to exemplary embodiments of the invention, the flexible display device may include a strain compensation layer, which is configured to control a position of a neutral plane in the flexible display device. In such embodiments, the strain compensation layer allows the neutral plane to be maintained in a reference area, which is predetermined based on positions of transistors in the flexible display panel, such that electric characteristics of the transistor may be effectively prevented from being deteriorated by a strain, which may occur when the flexible display panel is bent. Accordingly, even when the flexible display device is bent, the flexible display device operates substantially stably, thereby improving reliability of the flexible display device.

While exemplary embodiments of the inventions have been particularly shown and described, it will be understood by one of ordinary skill in the art that variations in form and detail may be made therein without departing from the spirit and scope of the attached claims.

What is claimed is:

1. A flexible display device comprising:
    a flexible display panel which displays an image;
    a strain gauge disposed in the flexible display panel, wherein the strain gauge senses a strain in the flexible display panel and generates a detection signal based on the sensed strain;
    a strain controller which receives the detection signal and outputs a strain compensation voltage based on the detection signal; and
    a strain compensation layer disposed on a surface of the flexible display panel and which receives the strain compensation voltage,
    wherein a thickness of the strain compensation layer is controlled based on the strain compensation voltage such that a neutral plane of the flexible display device is maintained in a predetermined reference area in the flexible display panel.

2. The flexible display device of claim 1, wherein the strain compensation layer comprises:
    a strain compensation material;
    an upper electrode disposed on an outer surface of the strain compensation material; and
    a lower electrode disposed between the strain compensation material and the flexible display panel and opposite to the upper electrode.

3. The flexible display device of claim 2, wherein
    the strain compensation voltage comprises upper and lower voltages, which are applied to the upper and lower electrodes, respectively, and
    the upper and lower voltages are different from each other.

4. The flexible display device of claim 3, further comprising:
    a cover film which covers the strain compensation layer; and
    an adhesive layer disposed between and attached to the cover film and the strain compensation layer.

5. The flexible display device of claim 4, wherein the strain compensation layer comprises:
    a first compensation layer disposed on the flexible display panel; and
    a second compensation layer disposed below the flexible display panel.

6. The flexible display device of claim 5, further comprising:
    the cover film comprises:
        a first film disposed on the flexible display panel; and a second film disposed below the flexible display panel, and the adhesive layer comprises:
  a first layer interposed between and attached to the first film and the first compensation layer; and
  a second layer interposed between and attached to the second film and the second compensation layer.

7. The flexible display device of claim 3, wherein
the flexible display panel comprises a pixel having a light-emitting area,
the upper and lower electrodes are disposed in the light-emitting area, and
at least one of the upper and lower electrodes comprises a transparent conductive material.

8. The flexible display device of claim 3, wherein
the flexible display panel comprises a pixel having a black matrix area, in which a black matrix is disposed, and
the upper and lower electrodes are disposed in the black matrix area.

9. The flexible display device of claim 1, wherein the strain compensation layer comprises a piezoelectric material, a dielectric elastomer or a combination thereof.

10. The flexible display device of claim 1, wherein
the flexible display panel further comprises:
  a lower base substrate; and
  a transistor disposed on the lower base substrate and comprising a semiconductor layer, and
the reference area is defined in a region between uppermost and lowermost surfaces of the semiconductor layer of the transistor, when viewed from a transverse cross-sectional view of the flexible display panel.

11. The flexible display device of claim 1, wherein the flexible display panel comprises:
  a display area in which an image is displayed; and
    a non-display area surrounding the display area, and
    the strain gauge is disposed in the non-display area.

12. A method of operating a flexible display device, the method comprising:
  sensing a strain in a flexible display panel of the flexible display device to generate a detection signal;
  generating a strain compensation voltage based on the detection signal; and
  controlling a thickness of a strain compensation layer disposed on a surface of the flexible display panel using the strain compensation voltage,
  wherein the thickness of the strain compensation layer is controlled to allow a neutral plane of the flexible display device to be in a predetermined reference area in the flexible display panel.

13. The method of claim 12, wherein
the strain compensation layer is disposed on the flexible display panel,
the strain compensation voltage increases a thickness of the strain compensation layer, when the neutral plane is positioned at a level higher than the reference area, and
the strain compensation voltage decreases the thickness of the strain compensation layer, when the neutral plane is positioned at a level lower than the reference area.

14. The method of claim 12, wherein
the strain compensation layer is disposed below the flexible display panel, and
the strain compensation voltage decreases a thickness of the strain compensation layer, when the neutral plane is positioned at a level higher than the reference area, and
the strain compensation voltage increases the thickness of the strain compensation layer, when the neutral plane is positioned at a level lower than the reference area.

15. The method of claim 12, wherein
the strain compensation layer comprises:
  a first compensation layer disposed on the flexible display panel; and
  a second compensation layer disposed below the flexible display panel, and
the generating the strain compensation voltage comprises generating first and second strain compensation voltages, which control thicknesses of the first and second compensation layers, respectively.

16. The method of claim 15, wherein
the first and second strain compensation voltages are generated to increase the thickness of the first compensation layer and decrease the thickness of the second compensation layer, when the neutral plane is positioned at a level higher than the reference area, and
the first and second strain compensation voltages are generated to decrease the thickness of the first compensation layer and increase the thickness of the second compensation layer, when the neutral plane is positioned at a level lower than the reference area.

* * * * *